United States Patent
Knopp et al.

(10) Patent No.: US 12,252,922 B2
(45) Date of Patent: Mar. 18, 2025

(54) DRIVE SYSTEM FOR OPENING AND CLOSING A MOTOR-VEHICLE DOOR, AND MOTOR VEHICLE HAVING THE DRIVE SYSTEM

(71) Applicant: STABILUS GMBH, Koblenz (DE)

(72) Inventors: Axel Knopp, Eitelborn (DE); Wilhelm Schwab, Koblenz (DE)

(73) Assignee: STABILUS GMBH, Koblenz (DE)

(*) Notice: Subject to any disclaimer, the term of this patent is extended or adjusted under 35 U.S.C. 154(b) by 0 days.

(21) Appl. No.: 18/274,801

(22) PCT Filed: Feb. 28, 2022

(86) PCT No.: PCT/EP2022/054919
§ 371 (c)(1),
(2) Date: Jul. 28, 2023

(87) PCT Pub. No.: WO2022/184608
PCT Pub. Date: Sep. 9, 2022

(65) Prior Publication Data
US 2024/0102331 A1 Mar. 28, 2024

(30) Foreign Application Priority Data
Mar. 1, 2021 (DE) ...................... 10 2021 104 891.5

(51) Int. Cl.
*E05F 1/10* (2006.01)
*E05F 1/12* (2006.01)
(Continued)

(52) U.S. Cl.
CPC .......... *E05F 15/611* (2015.01); *E05F 1/1091* (2013.01); *E05F 1/1207* (2013.01);
(Continued)

(58) Field of Classification Search
CPC ..... E05F 15/614; E05F 1/1215; E05F 1/1091; E05F 5/00; E05Y 2400/528;
(Continued)

(56) References Cited

U.S. PATENT DOCUMENTS 10,737,412 B2 * 8/2020 Heidari ................ B29C 59/046
11,332,969 B2 * 5/2022 Schmengler ............ E05F 5/025
(Continued)

FOREIGN PATENT DOCUMENTS

CN 101660381 A 3/2010
DE 100 53 551 A1 6/2001
(Continued)

OTHER PUBLICATIONS

English translation of DE102015207562 from WIPO (Year: 2016).*
International Search Report for PCT/EP2022/054919 mailed on Jun. 21, 2022.

*Primary Examiner* — Janet M Wilkens
*Assistant Examiner* — Susan M. Heschel
(74) *Attorney, Agent, or Firm* — Schmeiser, Olsen & Watts LLP

(57) ABSTRACT

A drive system for a motor vehicle door is provided including an electric motor and a hinge for fastening the motor vehicle door. The hinge includes a door leaf, a body leaf for attachment to the body and a hinge pin arranged coaxially to the hinge axis, and rotatably mounted on the body leaf. The electric motor includes a stator and a rotor arranged coaxially with the hinge axis in the stator and mounted rotatably about the hinge axis relative to the stator. The hinge pin is disposed in sections within the rotor, the rotor being coupled to the hinge pin in a gearless manner to transmit rotation. The drive system includes a tolerance ring arranged between the rotor and the hinge pin for transmitting the rotation from
(Continued)

Figure 1:
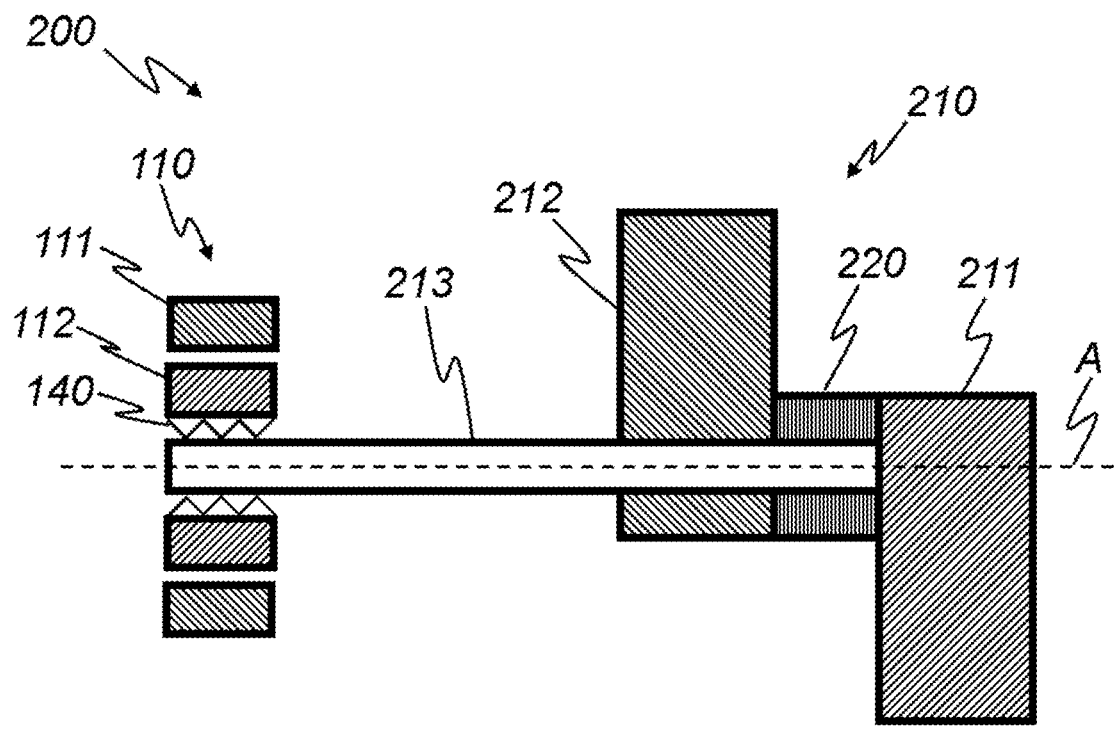

the rotor to the hinge pin, wherein the tolerance ring is coupled frictionally to the hinge pin or to the rotor.

11 Claims, 2 Drawing Sheets

(51) Int. Cl.
| | |
|---|---|
| *E05F 5/00* | (2017.01) |
| *E05F 15/611* | (2015.01) |
| *H02K 7/108* | (2006.01) |
| *H02K 9/00* | (2006.01) |
| *H02K 11/25* | (2016.01) |

(52) U.S. Cl.
CPC .............. *E05F 5/00* (2013.01); *H02K 7/108* (2013.01); *H02K 9/00* (2013.01); *H02K 11/25* (2016.01); *E05Y 2201/214* (2013.01); *E05Y 2900/531* (2013.01); *E05Y 2900/546* (2013.01)

(58) Field of Classification Search
CPC ........ E05Y 2200/214; E05Y 2900/531; H02K 7/108; H02K 9/00; H02K 11/25
See application file for complete search history.

(56) References Cited

U.S. PATENT DOCUMENTS

| | | | | |
|---|---|---|---|---|
| 11,434,681 | B2 * | 9/2022 | Rocholl | ................. B65F 3/046 |
| 2013/0205670 | A1 * | 8/2013 | Springborn | ........... E05F 15/611 |
| | | | | 49/358 |
| 2014/0020297 | A1 * | 1/2014 | Hammerle | .............. E05F 15/70 |
| | | | | 49/31 |
| 2021/0140516 | A1 * | 5/2021 | Gong | ........................ F16H 1/46 |

FOREIGN PATENT DOCUMENTS

| | | | | |
|---|---|---|---|---|
| DE | 202004008439 | U1 | 9/2004 | |
| DE | 102006043611 | A1 | 3/2008 | |
| DE | 102008045904 | B3 | 11/2009 | |
| DE | 102014208477 | B3 | 9/2015 | |
| DE | 102014221854 | A1 | 4/2016 | |
| DE | 102015201103 | A1 | 7/2016 | |
| DE | 102015207562 | A1 * | 10/2016 | |
| DE | 102017115229 | A1 | 1/2019 | |
| WO | 91/19645 | A1 | 12/1991 | |
| WO | WO-2017029035 | A1 * | 2/2017 | .............. E05F 15/70 |
| WO | 2019/076398 | A1 | 4/2019 | |

\* cited by examiner

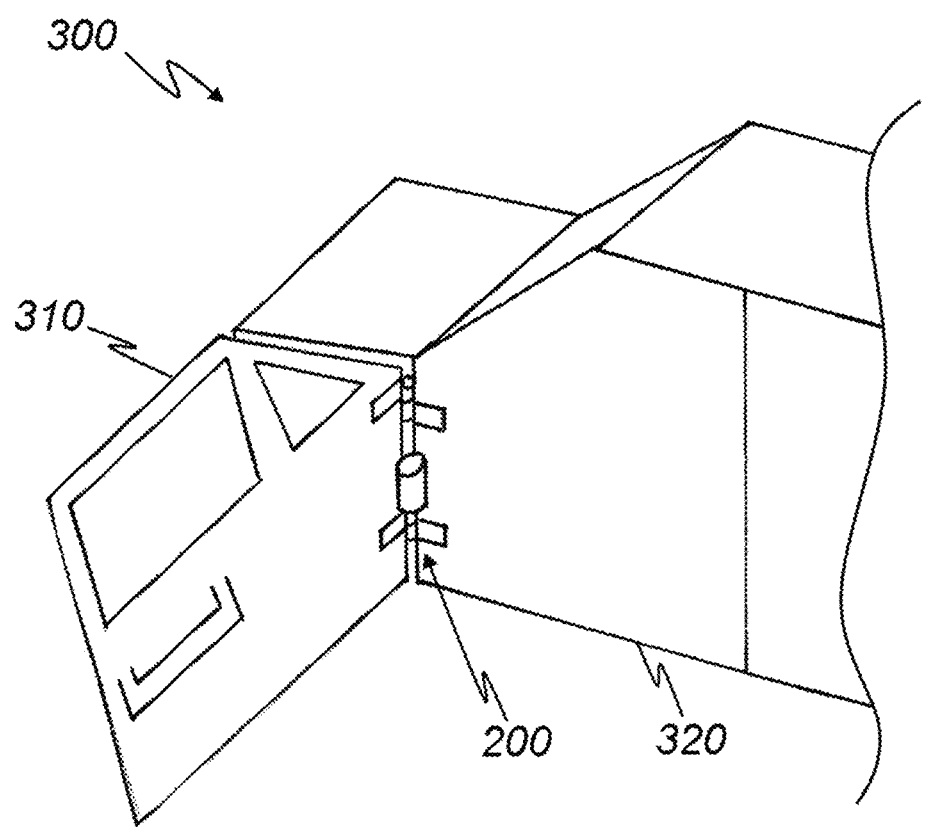

DRIVE SYSTEM FOR OPENING AND CLOSING A MOTOR-VEHICLE DOOR, AND MOTOR VEHICLE HAVING THE DRIVE SYSTEM

CROSS-REFERENCE TO RELATED APPLICATIONS

This application claims priority to PCT Application No. PCT/EP2022/054919, having a filing date of Feb. 28, 2022, based on DE10 2021 104 891.5, having a filing date of Mar. 1, 2021, the entire contents both of which are hereby incorporated by reference.

FIELD OF TECHNOLOGY

The following relates to a drive system for opening and closing a motor vehicle door comprising an electric motor and a hinge for fastening the motor vehicle door to a body of the associated motor vehicle to be rotatable about a hinge axis. The hinge comprises a door leaf for rigid attachment to the motor vehicle door, a body leaf for rigid attachment to the body and a hinge pin arranged coaxially to the hinge axis, rigidly attached to the door leaf and rotatably mounted on the body leaf about the hinge axis. The following further relates to a motor vehicle with the drive system.

BACKGROUND

The publication CN 101660381 A describes an electric drive for a pivoting vehicle flap. According to CN 101660381 A, the rotational movement of the motor shaft is transmitted to an operating rod for the vehicle flap via a coupling with several gears.

The publication DE 100 53 551 A1 discloses an electric drive unit for a swing door with a reversible electric motor and a reduction gear. The rotational movement of the motor is converted via an endless belt into a linear movement for driving the swing door.

The publication DE 10 2008 045 904 B3 discloses a drive for a flap of a motor vehicle with an electric motor that is supplemented with a gearbox. The rotational movement of the motor is converted via a toothed rack into a linear movement for driving the flap.

The publication WO 2019/076398 A1 discloses an electric drive with a gearbox for a pivoting motor vehicle door. The rotational movement of the motor is converted via a toothed rack into a linear movement for driving the motor vehicle door.

To ensure safe and reliable opening and closing of motor vehicle doors, in particular motor vehicle hatches, being often very heavy in modern motor vehicles, the drives must provide a high torque in a controlled manner and comprise a large number of mechanically interacting components for this purpose, which makes the drives relatively expensive and complex to manufacture and heavy, which is particularly disadvantageous for a supplier component of a motor vehicle, which should be particularly cost-effective and lightweight.

Furthermore, the installation space available for drives in motor vehicles is very limited, so that sufficiently strong and correspondingly voluminous drives cannot be used in many motor vehicles for opening and closing the vehicle doors.

The publication WO 91/19645 A1 discloses an electric drive for a pivoting flap of a spacecraft. The drive is designed as a direct drive with a hinge pin driven directly by an electric motor. Since the torque required to adjust the flap in weightlessness is considerably less than the torque required to open and close a motor vehicle door on Earth against the force of gravity, the drive according to WO 91/19645 A1 is not suitable for opening and closing a motor vehicle door.

Furthermore, with a spacecraft flap in zero gravity, there is no risk of the flap falling due to a malfunction of the drive, causing damage. In contrast, a motor vehicle door, especially a motor vehicle hatch, falling due to its weight force can cause significant injuries to a user. Therefore, the drive system described at the beginning must meet much higher safety requirements than the drive according to WO 91/19645 A1.

An advantage is to create a reliable and safe drive system for opening and closing a motor vehicle door, which is cheaper to manufacture and more lightweight and requires less installation space than known drive systems.

SUMMARY

An aspect relates to a drive system for opening and closing a motor vehicle door with an electric motor. The motor vehicle door is a side door, an engine bonnet, a boot lid, or a hatch of a motor vehicle. The motor vehicle door may in particular be designed as a swing door. The motor vehicle associated with the motor vehicle door is, for example, a passenger car, a lorry, or a bus.

The drive system comprises at least one hinge for fastening the motor vehicle door to a body of the associated motor vehicle to be rotatable about a hinge axis. The hinge comprises a door leaf for rigid attachment to the motor vehicle door, a body leaf for rigid attachment to the body and a hinge pin arranged coaxially to the hinge axis, rigidly attached to the door leaf and mounted on the body leaf rotatably about the hinge axis.

According to embodiments of the invention, the door leaf may be designed for rigid attachment to the vehicle body and the body leaf may be designed for rigid attachment to the motor vehicle door.

If the motor vehicle door is attached to the body with several hinges, one, several or all the hinges may be designed as hinges of the drive system according to embodiments of the invention.

The electric motor comprises a stator arranged coaxially to the hinge axis and a rotor arranged coaxially to the hinge axis in the stator and mounted rotatably relative to the stator about the hinge axis. The electric motor is thus designed as an internal rotor. The fact that the rotor and stator are arranged coaxially to the hinge axis means that rotation of the rotor can be transmitted to the hinge pin particularly easily and efficiently.

The drive system may include a stator coupling member for attaching the stator to the motor vehicle door or to the body of the associated motor vehicle.

The electric motor is designed to rotate the rotor at a speed in a speed operating range and with a torque to open and close the motor vehicle door in a torque operating range. Thus, in contrast to the drive in WO 91/19645 A1, the electric motor is designed to generate a sufficiently high torque to open and close the motor vehicle door.

The hinge pin is arranged in sections in the rotor. Due to this arrangement, the required installation space is smaller than in known drives for motor vehicle doors.

The rotor is coupled gearless to the hinge pin to transmit the rotation. Therefore, no torque conversion takes place between the rotor and the hinge pin. In order for the electric motor to be able to provide a sufficiently high torque at the hinge pin without torque conversion, the electric motor can be designed in particular as a torque motor, i.e., as a high-pole electric motor with high torque at low speed. By dispensing with a gearbox, the drive system is particularly inexpensive to manufacture, light and compact.

The drive system comprises a tolerance ring arranged coaxially to the hinge axis between the rotor and the hinge pin for transmitting the rotation from the rotor to the hinge pin, wherein the tolerance ring is coupled frictionally to the hinge pin and/or to the rotor, to the hinge pin and to the rotor, at least in the torque working range.

The tolerance ring ensures a reliable transmission of the rotation and can also form a slip clutch as overload protection due to the frictional coupling, without requiring much additional installation space.

The tolerance ring may be frictionally coupled only to the rotor or only to the hinge pin and positively coupled or coupled by a material bond to the other component. Because there is only one single frictional coupling in this case, an overload torque, above which the frictional coupling is released, can be set more reliably than with two frictional couplings.

The drive system comprises a rotation spring element coupled to the door leaf and to the body leaf to support an opening movement of the motor vehicle door. The rotation spring element is coupled to the door leaf and to the body leaf in such a way that the rotation spring element is tensioned against a spring tension during a closing movement of the motor vehicle door, so that a spring force resulting from the spring tension supports the opening movement.

In particular, if the motor vehicle door is a hatch, the drive system must apply a much higher torque to open the hatch against the weight force of the hatch than to close the hatch. If the weight force is at least partially, completely, compensated by the rotation spring element, the electric motor can be designed to be less powerful and accordingly smaller, more lightweight, and cheaper.

The rotation spring element comprises a torsion spring mounted coaxially to the hinge axis, on the hinge pin. This design leads to a particularly simple and compact construction of the drive system.

The torque operating range of the electric motor extends from 1 Nm to 2 Nm, from 1 Nm to 4 Nm, from 1 Nm to 6 Nm. The aforementioned torque operating ranges enable reliable opening and closing of conventional motor vehicle doors.

The speed range of the electric motor extends from 0 rpm to 20 rpm, from 0 rpm to 50 rpm. The above-mentioned speed ranges allow a particularly quiet operation of the drive system and result in a safe and comfortable speed of movement of the motor vehicle door when opening and closing.

The torque generated by the electric motor is substantially independent of the speed of the electric motor in the speed operating range. The torque is "essentially independent" of the speed if it varies as a function of the speed by at most 10%, by at most 5%, by at most 2%. This allows the drive system to open and close the motor vehicle door particularly reliably.

The tolerance ring is designed to decouple the hinge pin from the rotor if the torque acting on the tolerance ring is above an overload torque. In this embodiment, the tolerance ring acts in particular as a slip clutch for overload protection. In this way, the tolerance ring prevents, for example, excessive torque from being transmitted to the electric motor when the motor vehicle door is slammed or torn open by a user.

The overload torque of the tolerance ring is for example from 2 Nm to 8 Nm, from 4 Nm to 6 Nm. Such an overload torque protects both the drive system, in particular the electric motor and coupling elements for coupling the drive system to the motor vehicle door and the body of an associated motor vehicle, and the motor vehicle door and the body from damage and allows reliable opening and closing of the motor vehicle door.

A particular advantage of the tolerance ring is that the overload torque can be adapted to a specific motor vehicle door particularly easily by selecting a suitable tolerance ring, without having to adapt further components of the drive system.

The electric motor is designed for rotation of the rotor at a speed in the speed operating range and with a torque for opening and closing the motor vehicle door in the torque operating range with a supply voltage of the electric motor of maximum 24 V, maximum 12 V. This results in the advantage that the electric motor can be operated without a voltage converter with an on-board power supply voltage customary in motor vehicles.

Common electric motors for high torque are usually designed for a supply voltage of at least 48 V, so that they cannot generate the required torque for opening and closing the vehicle door at 24 V or less. To achieve the required torque with a low supply voltage, the electric motor can, for example, have a higher number of windings and/or a thicker wire than usual electric motors.

The electric motor has a diameter of 1 cm to 8 cm, 2.0 cm to 3.5 cm, transverse to the hinge axis. Such a diameter allows optimum utilisation of the installation space usually available in motor vehicles for the drive system but is smaller than that of conventional electric motors for generating high torques. Since the torque decreases as the diameter of the electric motor decreases, there is a risk that sufficient torque for opening and closing the motor vehicle door cannot be generated with the diameters mentioned.

The electric motor has a length of 2 cm to 13 cm, 4.0 cm to 6.5 cm, along the hinge axis. Such a length allows the generation of a sufficiently high torque for opening and closing the motor vehicle door even with a small diameter. The aforementioned lengths are greater than those of electric motors commonly used for drive systems of motor vehicle doors. However, since the drive system according to embodiments of the invention does not require a gearbox, the drive system according to embodiments of the invention can still have a sufficiently short construction length along the hinge axis for integration into a motor vehicle.

The electric motor has an aspect ratio of the length to the diameter of 1 to 5, of 2.0 to 2.5. Such an aspect ratio allows the generation of a sufficiently high torque with particularly efficient utilisation of the installation space usually available for the drive system in a motor vehicle.

The drive system comprises a brake module for braking a rotation of the hinge pin. The brake module brakes, for example, an uncontrolled movement of the motor vehicle door in the event of a failure of the electric motor and thereby reduces the risk of an accident. In particular, the brake module may be designed to hold the motor vehicle door in a partially or fully open position against a weight force and/or wind force of the motor vehicle door in the event of a failure of the electric motor, in particular when the motor vehicle is on a slope or on an inclined surface.

The brake module comprises an electrically controlled brake for automatically braking the rotation of the hinge pin in the event of a failure of a supply voltage of the electric motor. The brake can, for example, comprise an electromagnetic or electromechanical brake that brakes or stops the rotation of the hinge pin in a voltage free state. This makes the drive system smooth-running and energy-efficient when the supply voltage is applied and yet prevents uncontrolled movement of the motor vehicle door in the event of a supply voltage failure.

The drive system comprises a cooling module connected to the electric motor in a heat-conducting manner for cooling the electric motor. Since the electric motor must generate a higher torque than in known drive systems, the electric motor generates more heat than a motor of a known drive system. The cooling module can dissipate the heat, for example via cooling fins, to an environment of the drive system and thereby protect the electric motor from overheating.

The cooling module comprises an active cooling element, for example a Peltier element or a fan, for active cooling of the electric motor. An active cooling element can ensure reliable cooling with a smaller installation space requirement than a purely passive cooling module.

The cooling module comprises a temperature sensor for measuring a temperature of the electric motor. The temperature sensor can be communicatively connected to the active cooling element and/or to the electric motor to control the active cooling element and/or the electric motor depending on a temperature of the electric motor.

With the help of the temperature sensor, an impending overheating of the electric motor can be detected in time and prevented by increasing a cooling capacity of the active cooling element and/or by reducing a power of the electric motor.

Embodiments of the invention relate to a motor vehicle with a drive system according to the embodiments of the invention for opening and closing a motor vehicle door of the motor vehicle.

The motor vehicle comprises a linear spring element coupled to the motor vehicle door and to a body of the motor vehicle for supporting an opening movement of the motor vehicle door, wherein the motor vehicle door is configured as a hatch. The linear spring element is coupled to the motor vehicle door and to the body in such a way that the linear spring element is tensioned against a spring tension during a closing movement of the motor vehicle door, so that a spring force resulting from the spring tension supports the opening movement.

In particular, if the motor vehicle door is a hatch, the drive system must apply a much higher torque to open the hatch against the weight force of the hatch than to close the hatch. If the weight force is at least partially, fully, compensated by the linear spring element, the electric motor can be designed to be less powerful and correspondingly smaller, more lightweight, and cheaper.

The motor vehicle may comprise one or more, in particular two, linear spring elements.

The linear spring element comprises a gas pressure spring and/or a coil spring, a spring strut. The aforementioned embodiments of the linear spring element are available at low cost in a suitable design for supporting hatches.

BRIEF DESCRIPTION

Figure 2:
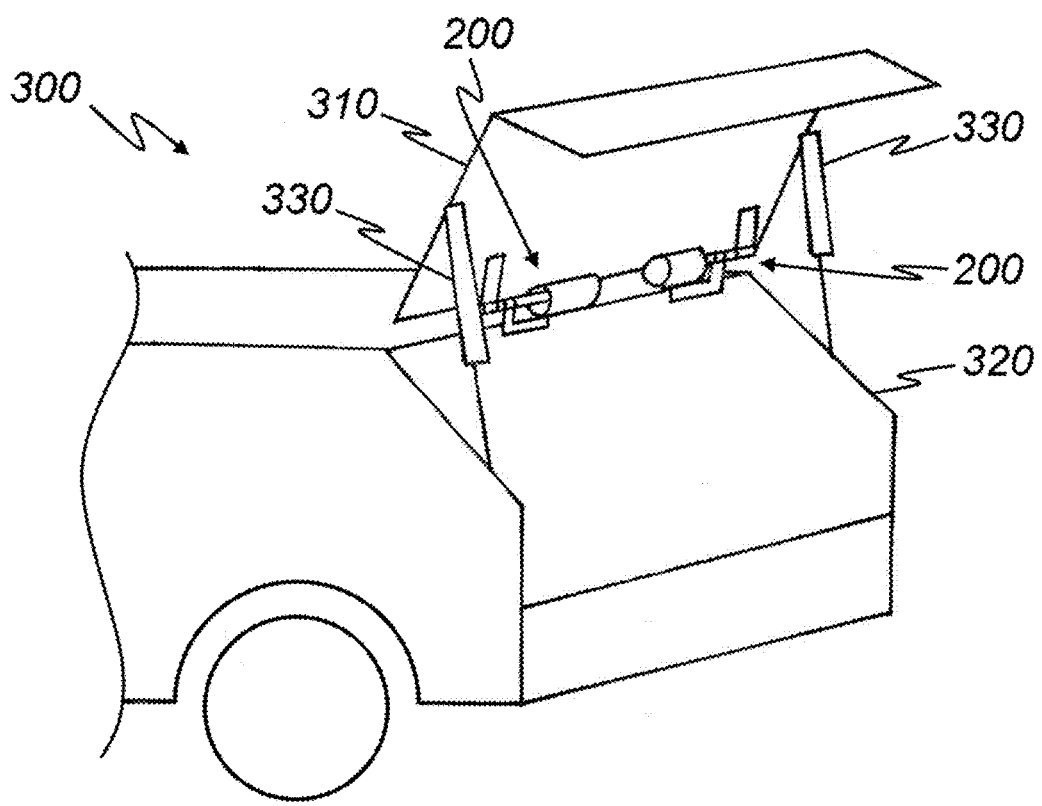

Some of the embodiments will be described in detail, with references to the following Figures, wherein like designations denote like members, wherein:

FIG. 1 schematically shows a drive system according to embodiments of the invention;

FIG. 2 schematically shows a motor vehicle according to embodiments of the invention; and FIG. 3 schematically shows a motor vehicle with a drive system according to embodiments of the invention.

DETAILED DESCRIPTION

FIG. 1 schematically shows a drive system 200 according to embodiments of the invention for opening and closing a motor vehicle door (not shown) comprising an electric motor 110 and a hinge 210 for fastening the motor vehicle door 310 to a body (not shown) of the associated motor vehicle to be rotatable about a hinge axis A.

The hinge 210 comprises a door leaf 211 for rigid attachment to the motor vehicle door, a body leaf 212 for rigid attachment to the body, and a hinge pin 213 arranged coaxially with the hinge axis A, rigidly attached to the door leaf 211 and mounted rotatably about the hinge axis A on the body leaf 212.

The electric motor 110 comprises a stator 111 arranged coaxially with respect to the hinge axis A and a rotor 112 arranged coaxially with respect to the hinge axis A in the stator 111 and mounted rotatably about the hinge axis A relative to the stator 111. The stator 111 can be attached to the body, for example, by a stator coupling element (not shown).

The electric motor 110 is configured to rotate the rotor 112 at a speed in a speed operating range and with a torque to open and close the motor vehicle door 310 in a torque operating range.

The hinge pin 213 is arranged in sections in the rotor 112, wherein the rotor 112 is coupled to the hinge pin 213 in a gearless manner to transmit rotation.

The drive system 200 comprises a tolerance ring 140 arranged coaxially to the hinge axis A between the rotor 112 and the hinge pin 213 for transmitting the rotation from the rotor 112 to the hinge pin 213, wherein the tolerance ring 140 is frictionally coupled to the hinge pin 213 and to the rotor 112 at least in the torque working range.

The drive system 200 may comprise a rotational spring element 220 coupled to the door leaf 211 and to the body leaf 212 for assisting an opening movement of the motor vehicle door 310, comprising a torsion spring mounted on the hinge pin 213 coaxially with the hinge axis A.

FIG. 2 schematically shows a motor vehicle 300 according to embodiments of the invention, for example a passenger car, with a number of, for example two, drive systems 200 according to embodiments of the invention for opening and closing a motor vehicle door 310 of the motor vehicle 300, which is designed as a hatch.

The motor vehicle door 310 is connected to the body 320 of the motor vehicle 300 by a number of, for example two, hinges, each of which is part of one of the drive systems 200. For example, the drive system 200 is configured as the drive system 200 shown in FIG. 1.

The motor vehicle 300 comprises a number of, for example two, linear spring elements 330 coupled to the motor vehicle door 310 and to a body 320 of the motor vehicle 300 for supporting an opening movement of the motor vehicle door 310.

The linear spring elements 330 are, for example, each configured as a gas pressure spring, which may be arranged on both sides of the motor vehicle door 310.

FIG. 3 schematically shows a motor vehicle 300, for example a passenger car, with a drive system 200 according to embodiments of the invention for opening and closing a motor vehicle door 310 of the motor vehicle 300, which is designed as a side door.

The motor vehicle door 310 is connected to the body 320 of the motor vehicle 300 by a number of, for example two, hinges, one of which is part of the drive system 200, for example. The drive system 200 is, for example, designed like the drive system 200 shown in FIG. 1.

Although the invention has been illustrated and described in greater detail with reference to the exemplary embodiments, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

List of reference signs

110 Electric motor
111 Stator
112 Rotor
140 Tolerance ring
200 Drive system
210 Hinge
211 Door leaf
212 Body leaf
213 Hinge pin
220 Rotation spring element
300 Motor vehicle
310 Motor vehicle door
320 Body
330 Linear spring element
A Hinge axis

The invention claimed is:

1. A drive system for opening and closing a motor vehicle door comprising:
   a. an electric motor; and
   b. a hinge for fastening the motor vehicle door to a body of the associated motor vehicle to be rotatable about a hinge axis,
      i. wherein the hinge comprises a door leaf for rigid attachment to the motor vehicle door;
      ii. a body leaf for rigid attachment to the body; and
      iii. a hinge pin arranged coaxially to the hinge axis, rigidly fixed to the door leaf, and mounted on the body leaf rotatably about the hinge axis
   c. wherein the electric motor
      i. comprises a stator arranged coaxially to the hinge axis and
      ii. a rotor arranged coaxially to the hinge axis in the stator and mounted rotatably about the hinge axis relative to the stator; and
      iii. is configured to rotate the rotor at a speed in a speed operating range and with a torque to open and close the vehicle door in a torque operating range;
   d. wherein the hinge pin is arranged in sections in the rotor;
   e. wherein the rotor is coupled to the hinge pin in a gearless manner to transmit rotation;
   f. wherein the drive system comprises a tolerance ring arranged coaxially to the hinge axis between the rotor and the hinge pin for transmitting rotation from the rotor to the hinge pin; and
   g. wherein the tolerance ring is frictionally coupled to the hinge pin and/or to the rotor at least in the torque working range.

2. The drive system according to claim 1, wherein the drive system further comprises a rotation spring element coupled to the door leaf and to the body leaf to support an opening movement of the motor vehicle door.

3. The drive system according to claim 2, wherein the rotation spring element further comprises a torsion spring mounted coaxially to the hinge axis on the hinge pin.

4. The drive system according to claim 1, wherein
   a. the torque operating range of the electric motor extends from 1 Nm to 2 Nm; and/or
   b. the speed operating range of the electric motor extends from 0 rpm to 20 rpm.

5. The drive system according to claim 1, wherein the torque generated by the electric motor in the speed operating range is substantially independent of the speed of the electric motor.

6. The drive system according to claim 1, wherein the tolerance ring is configured to decouple the hinge pin from the rotor when the torque acting on the tolerance ring is above an overload torque.

7. The drive system according to claim 6, wherein the overload torque of the tolerance ring is from 2 Nm to 8 Nm.

8. The drive system according to claim 1, wherein the electric motor is configured to rotate the rotor at a speed in the speed operating range and at a torque for opening and closing the motor vehicle door in the torque operating range with a supply voltage of the electric motor of at most 24 V.

9. The drive system according to claim 1, wherein the electric motor
   a. has a diameter of 1 cm to 8 cm transverse to the hinge axis and/or
   b. has a length of 2 cm to 13 cm along the hinge axis; and/or
   c. has an aspect ratio of the length to the diameter of from 1 to 5.

10. A motor vehicle comprising a drive system according to claim 1 for opening and closing a motor vehicle door of the motor vehicle,
   wherein the motor vehicle comprises a linear spring element coupled to the motor vehicle door and to a body of the motor vehicle for supporting an opening movement of the motor vehicle door.

11. The motor vehicle according to claim 10, wherein the linear spring element further comprises a gas pressure spring and/or a coil spring.

* * * * *